US006416608B1

(12) United States Patent
Mynott et al.

(10) Patent No.: US 6,416,608 B1
(45) Date of Patent: Jul. 9, 2002

(54) METHOD FOR PRODUCING A MULTI-LAYER LABEL AND DEVICE FOR IMPLEMENTING SAID METHOD

(75) Inventors: Stephen Arthur Mynott, Lexington, MA (US); Peter John Kuzma, Richboro, PA (US); Dieter Arabin, Langgöns (DE)

(73) Assignee: Avery Denison Corporation, Pasadena, CA (US)

( * ) Notice: Subject to any disclaimer, the term of this patent is extended or adjusted under 35 U.S.C. 154(b) by 0 days.

(21) Appl. No.: 09/424,881

(22) PCT Filed: May 28, 1998

(86) PCT No.: PCT/EP98/03202

§ 371 (c)(1), (2), (4) Date: Mar. 9, 2000

(87) PCT Pub. No.: WO98/54681

PCT Pub. Date: Dec. 3, 1998

(30) Foreign Application Priority Data

May 28, 1997 (DE) ........................................ 197 22 327

(51) Int. Cl.[7] ................................................ B32B 31/00

(52) U.S. Cl. ....................... 156/238; 156/259; 156/517; 156/519; 156/555

(58) Field of Search ................................ 156/516, 517, 156/519, 552, 555, 230, 238, 250, 259, 494, 495

(56) References Cited

U.S. PATENT DOCUMENTS

| | | | | |
|---|---|---|---|---|
| 5,059,950 A | | 10/1991 | Perchak | 340/572 |
| 5,146,204 A | * | 9/1992 | Zhou et al. | 340/551 |
| 5,495,250 A | | 2/1996 | Ghaem et al. | 342/51 |
| 5,602,528 A | | 2/1997 | Witchger | 340/551 |

FOREIGN PATENT DOCUMENTS

| | | |
|---|---|---|
| DE | 843 656 | 5/1952 |
| DE | 2 063 483 | 7/1972 |
| DE | 22 12 995 B2 | 4/1976 |
| DE | 32 21 500 A1 | 12/1983 |
| DE | 43 34 094 A1 | 4/1995 |
| EP | 0 446 910 A1 | 9/1991 |

OTHER PUBLICATIONS

International Patent Application WO 86/05302 (Reeb) dated Sep. 12, 1986.

* cited by examiner

*Primary Examiner*—James Sells
(74) *Attorney, Agent, or Firm*—Laurence A. Greenberg; Werner H. Stemer; Ralph E. Locher

(57) ABSTRACT

Method for Producing a multiple-layer label and device for implementing said method. A device for manufacturing a multiple-layer tag has two laminating rollers (10, 11) arranged as a pair, between which portions (14) of a coating web (1) are joined to a supporting web (13). The coating web (1) is alternately stopped and driven between the laminating rollers (10, 11) at the speed of the supporting web (13) by an advancing means (9). By means of stopping the coating web (1) for a longer or shorter period of time, the distance apart of the portions (14) on the supporting web (13) can be changed.

16 Claims, 3 Drawing Sheets

METHOD FOR PRODUCING A MULTI-LAYER LABEL AND DEVICE FOR IMPLEMENTING SAID METHOD

DESCRIPTION

Figure 1:
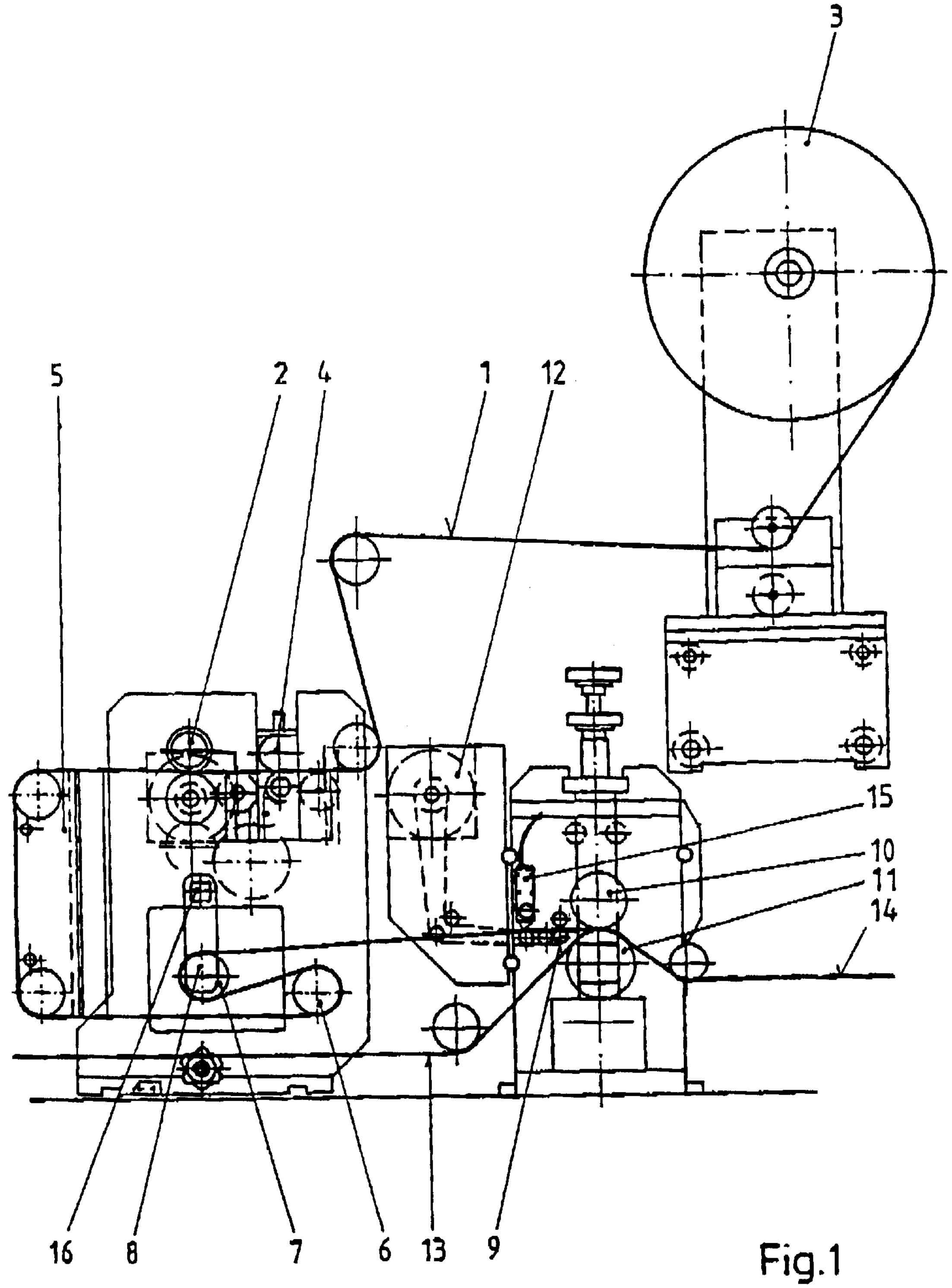

Method for Producing a multiple-layer label and device for implementing said method.

The invention relates to a method for manufacturing a multiple-layer tag, in which two webs of material are brought together by means of two parallel laminating rollers, and in which portions of a coating web arrive on a supporting web, spaced apart from one another. The invention furthermore relates to a device for implementing this method.

A method and a device of the type described hereinabove is described in WO 86/05302. In FIGS. 18 and 19 of this document it is shown how two webs of material are brought together by means of two laminating rollers and are joined together. Portions composed or printed conductor foils, each with a resonant electrical circuit for the purpose of protecting goods provided with the tag, in that when not deactivated, the resonant circuit triggers an alarm signal, are previously applied at a distance apart from one another to these webs of material.

The positioning of portions on a supporting foil is a very expensive phase of manufacturing, and limits the speed of production in mass production of tags. Furthermore, the manipulation of the cut-out portions necessary often leads to breakdowns.

In order to avoid such breakdowns, it is known from U.S. Pat. No. 5,059,950 to bring together a supporting web and a coating web such that the portions configured as security elements are spaced at the same distance apart on the supporting web as on the coating web provided with these portions. After the two webs of material have been brought together, they must be detached together in order to obtain one tag with one portion with each separation. The advantage of such a method is that only right at the end are there individual tags, so positioning of the portions relative to the supporting web is no longer necessary. However, it is disadvantageous that the portions are inevitably spaced at exactly the same distance apart on the supporting web as on the coating web. If it were desirable to produce tags which are larger than the portions, a coating web would have to be used where the security elements forming the portions were spaced apart, which would be a waste of material with respect to the coating web and would make changing the spacings possible only if the coating web were to be changed correspondingly.

The object of the invention is to further develop a method of the type described in the introduction such that tags can be manufactured particularly easily, rapidly and reliably, which tags have a larger area than a portion provided on them, in particular a security element. Furthermore, a device for implementing this method will be developed.

The problem described firstly is solved according to the invention in that the coating web is alternately advanced to the laminating rollers or to a pair of rollers connected in front of these at the circumferential speed of the pair of rollers, then a portion of the coating web advanced is detached, and lastly the coating web is stopped for a defined period of time.

Using this method, the manipulation and positioning of individual portions on the supporting web, which is time-consuming and prone to causing numerous breakdowns, is eliminated. In exactly the same manner as according to the method described previously in U.S. Pat. No. 5,059,950, the portions can be continuously fed to the supporting web by means of the coating web, and need to be detached from the coating web only directly before or during lamination. In spite of using this method, it is possible to change the spacings between the portions on the supporting web in that the coating web can be stopped for a longer or shorter period and in this way the supporting web can advance for a longer or shorter distance. In this way the method according to the invention is just as reliable and can be carried out just as quickly as that according to U.S. Pat. No. 5,059,950 described herein, but is variable in a manner similar to WO 86/05302.

When the method is implemented, the operations phase of applying an adhesive layer is eliminated when a supporting web with an adhesive layer facing the coating web is used.

It is also advantageous when, in accordance with another further development of the method, the adhesive layer applied to the supporting web is temporarily covered with a protective foil and this is removed before the bringing together of the supporting web and the coating web. In this way the adhesive layer remains protected from unintentional adhesion for as long as possible. Re-use of the protective foil removed is possible after the coating web has been applied.

Where a plurality of rows of portions are to be applied to a wide supporting web which is later to be separated into a plurality of individual webs of tags, the spacing of the portions can vary from row to row when the coating web is divided into two or more longitudinal strips by a fanning means before being applied to the supporting web.

The problem described secondly, that is to say the provision of a deice for implementing the method according to the invention, is solved in accordance with the invention with a device which has two parallel laminating rollers for bringing together two webs of material, in that in front of the parallel laminating rollers there is arranged an advancing means driven by a servo-motor, which is set up for alternate stopping and driving of the coating web at the speed of the supporting web.

Such a device allows the advancing of the coating web to be interrupted for defined periods of time in a simple manner, and thereby the changing of the spacings of the portions on the supporting web in a defined manner. In this way the device according to the invention makes it possible to change the spacings of the portions on the supporting web just by different settings of the device and by changing of the cutting tool. In spite of this possibility for adjustment, the device according to the invention is constructed in a very simple manner and is easy to operate as no separate portions have to be manipulated and positioned on the supporting web.

The individual portions of the coating web can be separated from the coating web in a single operating phase together with lamination when one laminating roller is equipped with at least one stamping blade which projects from the contour of the laminating roller exclusively for detaching the coating web applied to the supporting web.

The advancing means does not need to accelerate the entire coating web when advancing a portion of the coating web towards the laminating rollers, when, for tensioning the coating web, in front of the advancing means a roller partly looped around by the coating web is arranged on a pendulum. Slack is obtained by means of the roller on the pendulum, from which the advancing means takes up the area of the coating web currently required. Furthermore, in this way the coating web can be payed out from a stock roll at a constant speed.

An insufficient length of slack in the coating web or excessively fast paying out of the coating web from the stock roll can be prevented using very simple means, when in accordance with another development of the invention, the pendulum has control means for controlling a feed drive connected in front of it for paying out the coating web from a stock roll.

When the device is configured for cutting the coating web into a plurality of strips running parallel to one another, a fanning means for spreading out the strips can be arranged between the feed drive and the pendulum. It is then possible not only to change the spacing of the portions in the direction of movement of the supporting web, but also the spacing of the portions at right-angles thereto.

Unintentional gluing together of the two webs of material before reaching the laminating rollers can be prevented in that a separating element separating the coating web from the supporting web until they are fed into the laminating rollers is arranged on the feed-in side of the laminating rollers. This separating element can, for example, be configured as a separating plate or be composed of separating rods.

Instead of separating the portions from the coating web only after applying them to the supporting web, the operational phase of separation can also be carried out directly prior to this. A device configured for this is characterised in that an additional cutting roller for separating the portions from the coating web is assigned to the laminating roller for advancing the coating web, and in that the laminating roller is configured for transporting the portions to the supporting web on the other laminating roller.

The separated portions must be retained on the cutting roller after separation so that can be fed to the supporting web without changing their position. To do this, the portions could be held on the cutting roller by a partial vacuum. The cutting roller is particularly simply configured when the laminating roller for advancing the coating web is provided with a pressing means covering its lateral surface between the cutting roller and the laminating roller.

Separation of the portions from the coating web is inevitably always in exactly the right area, so when the portions are security elements there is no risk of them being destroyed by being cut in the wrong place if, in accordance with a further development of the invention, in order to control the advancing means a measuring means for recognising an end of a portion on the coating web is arranged in front of the laminating rollers.

Figure 2:
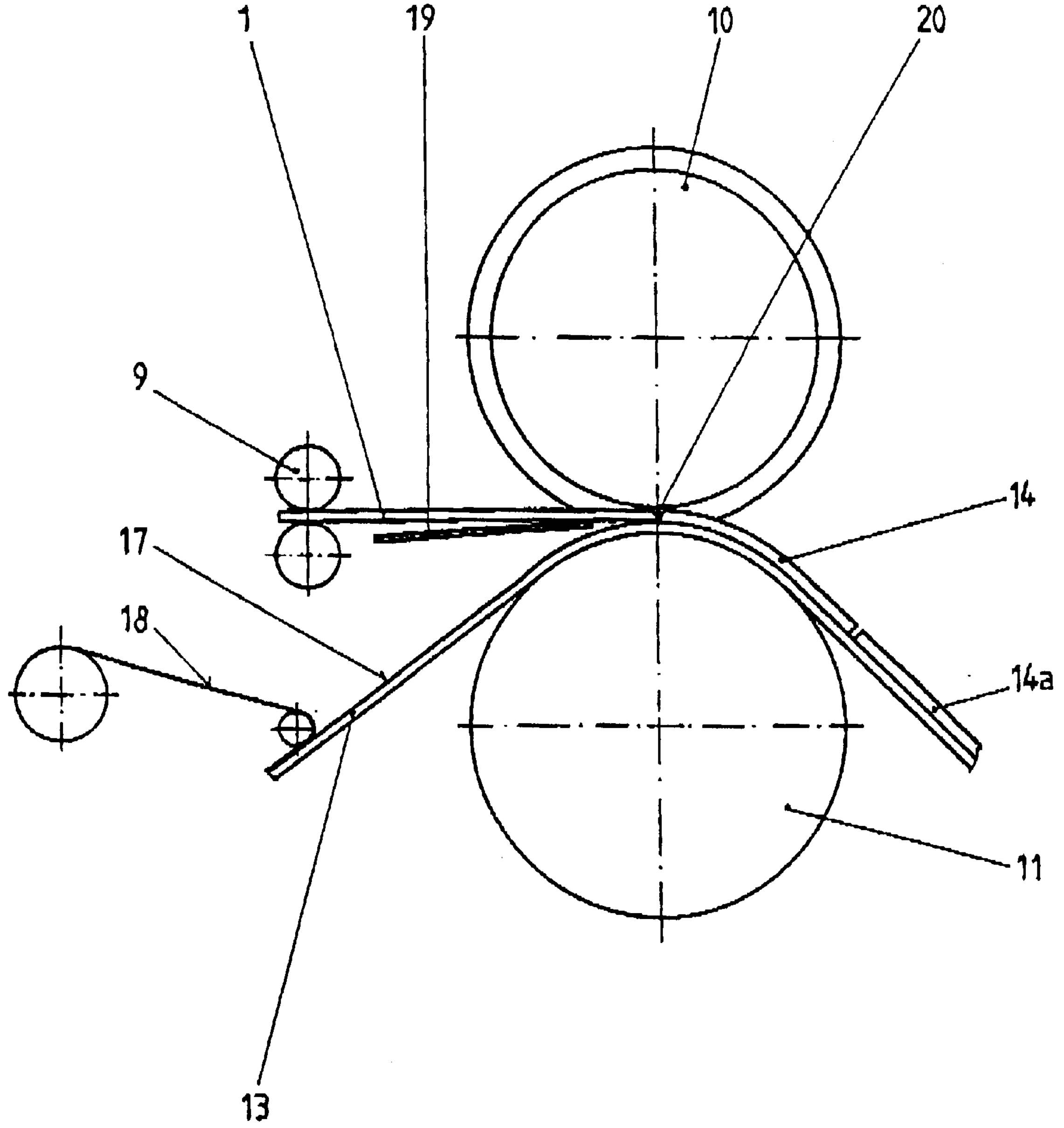
Figure 3:
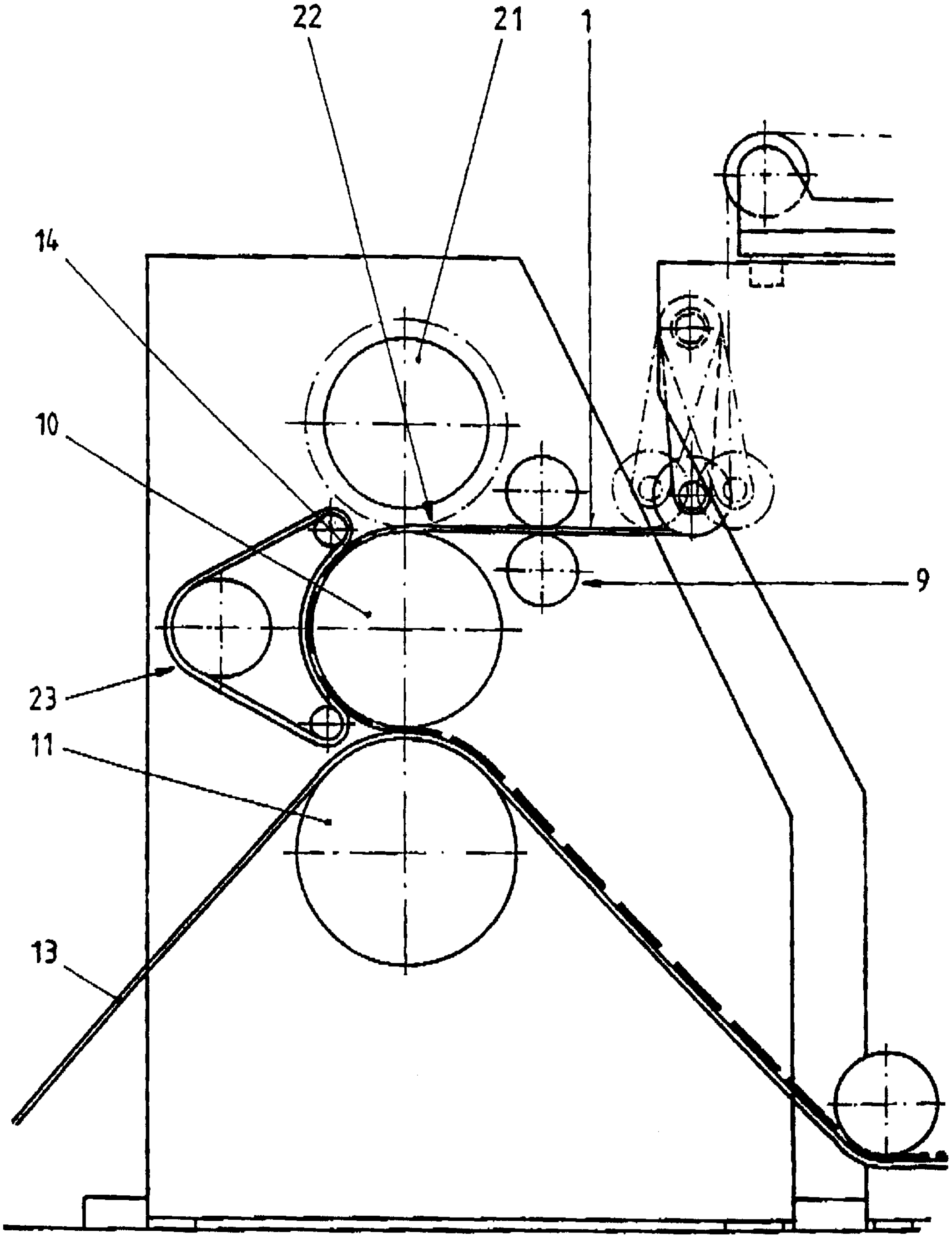

The invention allows numerous embodiments. For the purpose of further clarification of the method, two embodiments of the device are shown in the drawings, and will be described hereinafter. There is shown, in:

FIG. 1 a longitudinal section through the device for implementing the method, FIG. 2 a detailed representation of FIG. 1, FIG. 3 a further embodiment in accordance with the invention.

FIG. 1 shows a device for manufacturing a multiple-layer tag in its entirety. In it, a coating web 1 is drawn from a stock roll 3 by means of a forward feeding drive 2. This coating web 1 is separated by a cutting means 4 into a plurality of webs running parallel to one another, which are then spread out at a distance apart by means of a fanning means 5 and then fed via a guide roller 6 to a roller 7. This roller 7 is arranged at the free end of a pendulum 8 which is pretensioned to the left as seen in FIG. 1 in a manner not shown in more detail.

From the roller 7 the coating web 1 travels over an advancing means 9 between two laminating rollers 10, 11. The advancing means 9 is alternately driveable and stoppable by means of a servo-motor 12.

In addition to the coating web 1, a supporting web 13 runs in the device between the laminating rollers 10, 11, where portions 14 of the coating web 1 are glued to the supporting web 13. Prior to this, the exact position of the portions 14 is sensed by a measuring means 15 which is arranged in front of the advancing means 9, above the coating web 1.

During operation of the device, the pendulum 8 is located in the intermediate position shown, from which it can swing to both sides in order to keep the coating web 1 continuously under tension. A potentiometer 16 moves with the swinging of the pendulum 8 and accordingly controls the forward feed drive 2, by means of which the coating web 1 is unwound from the stock roll 3.

FIG. 2 shows a detailed representation of the two laminating rollers 10 and 11. The supporting web 13 is provided with an adhesive layer 17, from which a protective foil 18 is removed shortly before joining with the coating web 1. Premature and undesired adhesion of the adhesive sheet 17 is prevented by means of a separating element 19 configured as a separating plate. This separating element 19 projects into the space between the two laminating rollers 10, 11. The laminating roller 10 is equipped with a stamping blade 20 which, after each revolution of the laminating roller 10, separates the portion 14, 14*a* from the coating web 1. The laminating roller 10 forms a stamping cylinder, while the laminating roller 11 is a counter stamping cylinder. The stamping blade 20 in this case only detaches the coating web 1 from the layers lying on top of one another, composed of the supporting web 13, the adhesive sheet 17 and the coating web 1. After separation of the portion 14, 14*a*, the coating web 1 is stopped by the advancing means 9 shown in FIG. 1 until a defined distance from the portion 14, 14*a* which has passed on ahead is reached, and is then transported at the speed of the supporting web 13 to the laminating rollers 10, 11.

FIG. 3 shows a particular embodiment of the device according to the invention. In this, a cutting roller 21 with a stamping blade 22 is arranged above the laminating roller 10. This cutting roller 21 cuts the portions 14 from the coating web 1. In exactly the same way as with the embodiment previously described, spaces are created between the portions 14 in that the coating web 1 is temporarily stopped by the advancing means 9 after each cutting procedure.

A pressing means 23 ensures that the portions 14 remain on the upper laminating roller 10 and go between the two laminating rollers 10, 11 in order to be applied to the supporting web after rotation about 180°.

List of Designations

1 Coating web
2 Forward-feeding drive
3 Stock roll
4 Cutting means
5 Fanning means
6 Guide roller
7 Roller
8 Pendulum

9 Advancing means

10 Laminating roller

11 Laminating roller

12 Servo-motor

13 Supporting web

14 Portion

15 Measuring means

16 Potentiometer

17 Adhesive layer

18 Protective foil

19 Separating element

20 Stamping blade

21 Cutting roller

22 Stamping blade

23 Pressing means

What is claimed is:

1. A method for manufacturing a multiple-layer tag, in which two webs of material are brought together by two parallel laminating rollers, and in which portions of a coating web arrive on a supporting web spaced apart from one another, which comprises the following steps:

advancing a coating web to laminating rollers or to a pair of rollers connected in front of the laminating rollers, at the circumferential speed of the pair of rollers;

dividing the coating web into at least two parallel running longitudinal strips using a cutting device and fanning out the at least two longitudinal strips using a fanning device, before applying to a supporting web;

detaching a portion of the coating web and stopping the coating web advancing towards the laminating roller for a defined period of time.

2. The method according to claim 1, wherein the supporting web has an adhesive layer facing the coating web.

3. The method according to claim 2, wherein the adhesive layer of the supporting web is temporarily covered with a protective foil and the protective foil is removed before the bringing together of the supporting web with the coating web.

4. A device for implementing a method for manufacturing a multiple-layer tag, comprising:

two parallel laminating rollers for bringing a supporting web and a coating web together, portions of the coating web arriving spaced apart from one another on the supporting web; and an advancing device driven by a servo-motor and disposed in front of said parallel laminating rollers for alternately stopping and driving the coating web at a speed of the supporting web.

5. The device according to claim 4, wherein one of said laminating rollers is equipped with at least one stamping blade which projects from the contour of the laminating roller exclusively for detaching the coating web applied to the supporting web.

6. The device according to claim 4, further comprising a roller partly looped around by the coating web and disposed on a pendulum for tensioning the coating web.

7. The device according to claim 6, wherein the pendulum has a control device for controlling a forward feed drive connected in front of the pendulum for paying out the coating web from a stock roll.

8. The device according to claim 4, further comprising:

a cutting device for cutting the coating web into a plurality of strips running parallel to one another; and a fanning device for spreading out the strips, said fanning device disposed between the forward feed drive and the pendulum.

9. The device according to claim 4, further comprising a separating element disposed on a feed-in side of the laminating rollers for separating the coating web from the supporting web until they are fed into the laminating rollers.

10. The device according to claim 1, further comprising an additional cutting roller for separating the portions from the coating web, said additional cutting roller associated with the laminating roller for advancing the coating web, and one of said laminating rollers transporting the portions to the supporting web on the other of said laminating rollers.

11. The device according to claim 10, wherein, the laminating roller for advancing the coating web is provided with a pressing device covering its lateral surface between said cutting roller and said laminating roller.

12. The device according to claim 1, further comprising a measuring device disposed in front of the laminating rollers for recognizing an end of a portion on the coating web in order to control the advancing device.

13. A method for manufacturing a multiple-layer tag, which comprises the following steps:

advancing a coating web towards a pair of rollers positioned in front of laminating rollers at a circumferential speed of the pair of rollers;

detaching a portion of the coating web; and stopping the coating web advancing towards the laminating roller for a defined period of time while continuing advancing the coating web towards the pair of rollers at the circumferential speed of the pair of rollers.

14. The method according to claim 13, which further comprises bringing together the coating web with a supporting web using the laminating rollers.

15. The method according to claim 14, which further comprises removing a protective foil covering an adhesive layer of the supporting web before bringing together the supporting web with the coating web.

16. The method according to claim 13, which further comprises dividing the coating web into at least two parallel running longitudinal strips using a cutting device and fanning out the at least two longitudinal strips using a fanning device, before bringing together the supporting web with the coating web.

* * * * *